(12) United States Patent
Hsu et al.

(10) Patent No.: US 8,982,473 B2
(45) Date of Patent: Mar. 17, 2015

(54) WIDE ANGLE PROJECTION LENS

(71) Applicant: Young Optics Inc., Hsinchu (TW)

(72) Inventors: Ya-Ling Hsu, Hsinchu (TW); Zhan-Yu Liu, Hsinchu (TW)

(73) Assignee: Young Optics, Inc., Hsinchu (TW)

( * ) Notice: Subject to any disclaimer, the term of this patent is extended or adjusted under 35 U.S.C. 154(b) by 152 days.

(21) Appl. No.: 13/725,240

(22) Filed: Dec. 21, 2012

(65) Prior Publication Data

US 2014/0118838 A1   May 1, 2014

(30) Foreign Application Priority Data

Oct. 25, 2012   (CN) .......................... 2012 1 0412909

(51) Int. Cl.
*G02B 3/00*   (2006.01)
*G02B 13/06*   (2006.01)
*G02B 13/18*   (2006.01)

(52) U.S. Cl.
CPC ............. *G02B 13/06* (2013.01); *G02B 13/18* (2013.01)
USPC ........................................................ 359/649

(58) Field of Classification Search
USPC ........................................................ 359/649
See application file for complete search history.

(56) References Cited

U.S. PATENT DOCUMENTS

2004/0257670 A1* 12/2004 Kawakami ................... 359/680

FOREIGN PATENT DOCUMENTS

| JP | 2008096984 A | 4/2008 |
| JP | 2008165187 A | 7/2008 |
| JP | 2009134254 A | 6/2009 |
| JP | 2009251457 A | 10/2009 |
| JP | 2010122573 A | 6/2010 |
| WO | WO-2012-132294 A | 10/2012 |

OTHER PUBLICATIONS

Office Action for Japanese Patent Application No. 2013-221162 prepared by the Japanese Patent Office, mailed Sep. 2, 2014, 5 pages.

* cited by examiner

*Primary Examiner* — James Jones
(74) *Attorney, Agent, or Firm* — Haynes and Boone, LLP

(57) ABSTRACT

The present invention uses the concave hybrid architecture to form a wide angle projection lens with large numerical aperture. The wide angle projection lens includes a refraction system and a reflection system, wherein the refraction system includes a first lenses group containing a plurality of spherical lenses and at least one spherical lenses, and a second lenses group containing at least two aspheric lenses and at least one spherical lens, and the at least one spherical lens is configured between any two of the at least two aspheric lenses. The present invention is beneficial in reducing the wide angle projection lens in size and is able to effectively overcome the problem in low geometric efficiency, and enable the ultra-short focus projector have compact and portable advantages.

19 Claims, 13 Drawing Sheets

WIDE ANGLE PROJECTION LENS

The application claims the benefit of China Patent Application No. 201210412909.9, filed on Oct. 25, 2012, in the State Intellectual Property Office of the People's Republic of China, the disclosure of which is incorporated by reference as if fully set forth herein.

FIELD OF THE INVENTION

The present invention relates to an ultra-wide angle lens, particularly relates to an ultra-wide angle lens for projecting.

BACKGROUND OF THE INVENTION

In the present, the wide angle projection lens can effectively shorten the distance between the projection screen and the projector, and obtain a large size of the projection image. However, an aberration derived from the wide angle projection lens, such as distortion, field curvature, astigmatism, etc., are all the problems that must be faced when designing the wide angle projection lens. In order to ensure the optical quality, the wide angle lens usually narrows the numerical aperture, and the f-numbers of the wide angle lens are mostly ranged between 2.4~2.7, or even larger.

In general, the wide angle projection lens, which can shorten the focal length and overcome the problems of the aberration at the same time, are usually designed in three manners:

1. Refraction type: the wide angle lens is designed with the whole refractive lenses. The spherical lenses or the aspherical lenses are usually used in the wide angle lens to achieve the function of wide angle.
2. Reflection type: the wide angle lens is designed with the whole reflective minors. The spherical, the aspherical or plane reflectors are usually used in the wide angle lens.
3. Hybrid type (refraction+reflection): the lenses will be used at the object side and at last, the reflector will be used at the image side to achieve the wide angle function. The reflector can also be classified into three typical types, which are the plane reflector, the concave reflector and the convex reflector respectively.

However, the above-mentioned three manners remains having disadvantages and problems as follows:

1. There are too many refractive lenses in the refraction type wide angle lens, which causes the lens barrel being too long and dispersed, such as lateral color, axial color, aberration and geometric distortion, produced by the refraction type wide angle lens are not easy to be eliminated. In addition, the large numbers of the lenses in the refraction type wide angle lens make a high complexity when designing, and the manufacturability thereof is very low.
2. Since there is none of refractive lens in the reflection type wide angle lens, which can achieve the zero-dispersion, the reflectors designed to be used in the reflection type wide angle lens require many aspherical reflectors or free-surface reflectors, which causing the manufacturability thereof is very low.
3. The hybrid type (refraction+reflection) mixes the refraction type and reflection type, which can balance the optical properties and manufacturability at the same time, and is the common type on the market currently. In order to achieve the ultra-wide angle and avoid the optical path length larger than the projection distance, the straight optical path must be turned, so that the optical components and machinery dimensions also become larger, resulting in a substantial increase for the difficulty of the component manufacturing. If using the complicated free-surface reflector, the assembly tolerances may also quite sensitive. In addition, in the three abovementioned reflectors, the plane reflector has no curvature, so that the lens must rely on the adjustment of the distance between the lens and the reflector to achieve a wider angle. That is why the lens becomes longer which sacrifices the space. Although the convex reflector has curvature which can compensate for the aberration, the convex reflector will be difficult to be covered by this mechanism owing to the geometry form. Therefore, the lens mostly belongs to the exposed design in the present. However, the exposed design will increase the probability of the damage of the mirror surface, causing that there is not any dustproof effect in this exposed design and thus the stability thereof is not well, which only suitable for wall-mounted design. The concave reflector has the function of the convex reflector and can overcome the problem of the exposed mirror, which is a better option for the designer to design the wide angle projection lens. Although the concave reflector collocate with the hybrid design can resolve the problems caused by the plane and the convex reflectors, the volume is larger, comparing to the general front projector, for achieving the wide angle effect. For shortening the length of the lens barrel, the reflector will be added into the lens for turning. However, the width or the height of the lens will be increased when adding the reflector into the lens. Such kind of design cannot shorten the lens barrel effectively.

Accordingly, to design a wide angle projection lens with shortened focal length for achieving the decreased of the lens barrel and will not produce the aberration derived in general wide angle projection lens under the condition of a large numerical aperture, is a difficult challenge for overcoming.

It is therefore attempted by the applicant to deal with the above situation encountered in the prior art.

SUMMARY OF THE INVENTION

In order to design a wide angle projection lens without aberration under the large numerical aperture and small volume, the present invention utilizes the spherical lenses, aspherical lenses and the concave reflector to form the wide angle projection lens. The wide angle lens can effectively shorten the focal length, for decreasing the lens barrel, and also can improve the lens aberration in the large numerical aperture, which refers to decrease the aberration of the wide angle projection lens.

In a wide angle lens for decreasing an imaging aberration in a large numerical aperture, including: a refraction system and a reflection system. The refraction system including a first lens group having a plurality of spherical lenses and at least one aspherical lens and a second lens group including at least one spherical lens and at least two aspherical lenses, wherein the at least one spherical lens is configured between any two of the at least two aspherical lenses.

In a wide angle lens for decreasing an imaging aberration in a large numerical aperture, including a refraction system including a first lens group having at least one spherical lens and at least two aspherical lenses, wherein the at least one spherical lens is configured between any two of the at least two aspherical lenses.

In a decreasing a focus of a wide angle lens process, wherein the wide angle lens includes a field lens and an aspherical lens, and the field lens includes an incident side, the method including a step of configuring the aspherical lens at the incident side of the field lens.

Other objects, advantages and efficacy of the present invention will be described in detail below taken from the preferred embodiments with reference to the accompanying drawings, in which:

BRIEF DESCRIPTION OF THE DRAWINGS

FIG. 4 is a cross-section-viewed schematic diagram illustrating a beam passing through the wide angle projection system, wherein

FIG. 8 is an optical analog data diagram illustrating the image quality, wherein

FIG. 9 is an optical analog data diagram illustrating the image quality, wherein

DETAILED DESCRIPTION

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

Figure 1:
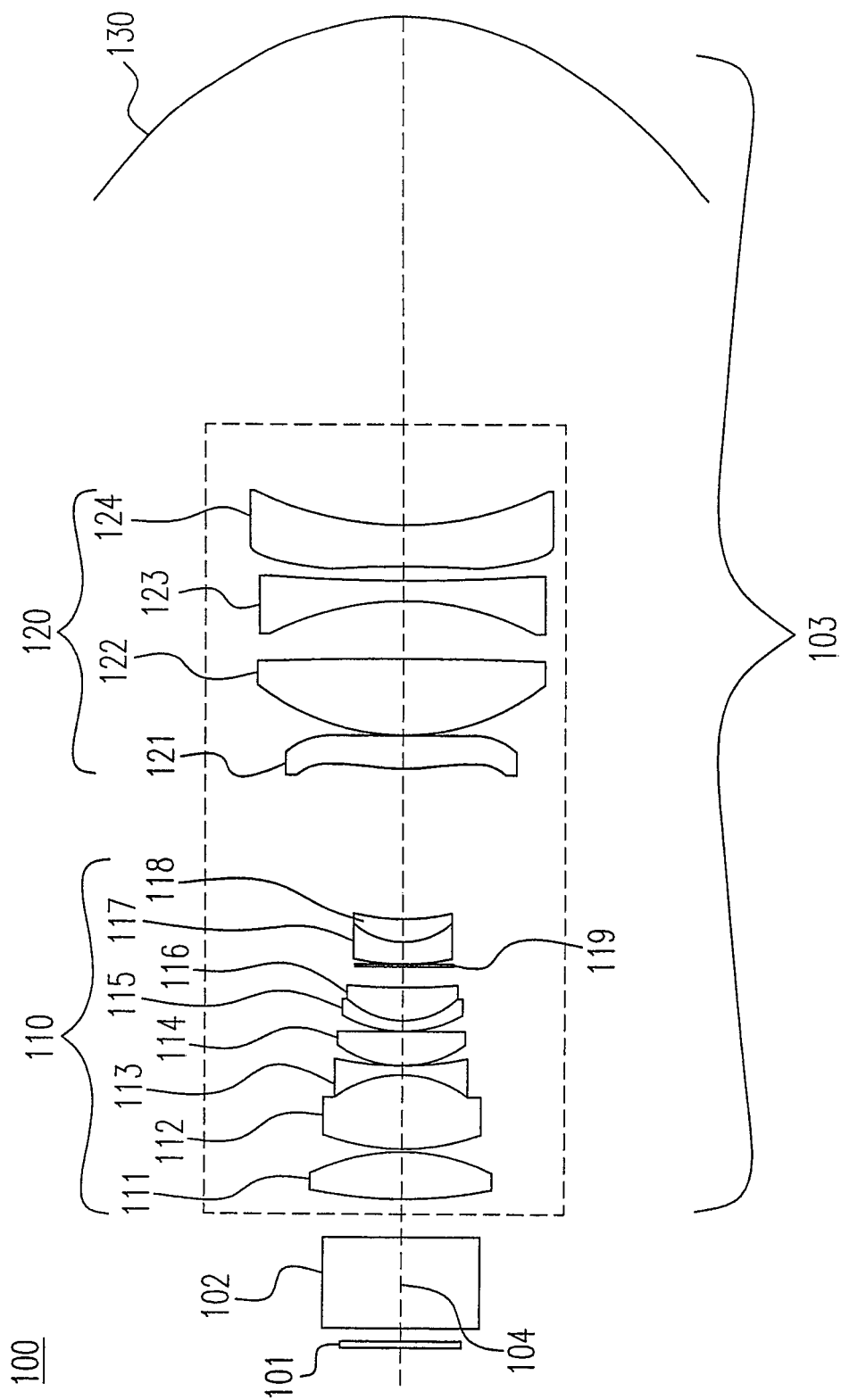
FIG. 1 is a cross-section-viewed schematic diagram illustrating the wide angle projection system in accordance with the present invention.

FIG. 1 is a schematic diagram illustrating a wide angle projection system according to the present invention. The wide angle projection system 100 includes an optical axis 104, an image processing element 101, a total reflection prism 102 and a wide angle projection lens 103, wherein the wide angle projection lens 103 includes a refraction system and a reflection system. The refraction system includes a first lens group 110 and a second lens group 120, and the reflection system is a reflector 130. The wide angle projection lens 103 is configured between an object point (not shown) and an image point (not shown), wherein the object point is near a side of the image processing element 101, the image point is an image of the object point through the wide projection lens 103, and a beam passes from the object point to the image point. The lenses between the object point and the image point respectively are the first lens group 110, the second lens group 120 and the reflector 130. The sequence of the first lens group 110 arranged from the object point to the image point respectively is a first spherical lens 111, a second spherical lens 112, a third spherical lens 113, a fourth spherical lens 114, a fifth spherical lens 115, a sixth spherical lens 116, an aperture stop 119, a first aspherical lens 117 and a seventh spherical lens 118. The sequence of the second lens group 120 arranged from the object point to the image point respectively is a second aspherical lens 121, an eighty spherical lens 122, a ninth spherical lens 123 and a third aspherical lens 124. The reflector 130 is an axisymmetric aspherical concave reflector used to reflect the beam passing through the first lens group 110 and the second lens group 120.

The wide angle projection lens 103 of the present invention has a first equivalent focal length F1, the refraction system formed by the first lens group 110 and the second lens group 120 has a second equivalent focal length F2, and the reflector 130 has a third equivalent focal length F3. The wide angle projection lens of the present invention complies with the following conditions:

$$2.5 < |F2/F1| < 25.2$$

$$2.5 < |F3/F1| < 20.8$$

The image processing element 101 of the present invention is a light valve element, including a digital micromirror device (DMD), a gating light valve and a liquid crystal on silicon.

Figure 2A:
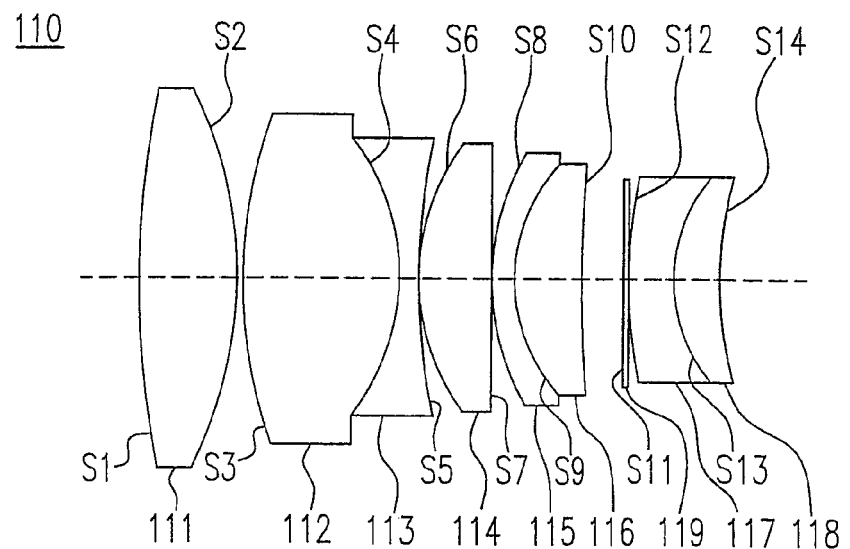
FIG. 2 (a) and FIG. 2 (b) are cross-section-viewed schematic diagrams illustrating a first lens group and a second lens group in accordance with the present invention.

FIG. 2(a) is a schematic diagram illustrating the first lens group 110 of the present invention. The diopters of the first spherical lens 111, the second spherical lens 112, the third spherical lens 113, the fourth spherical lens 114, the fifth spherical lens 115, the sixth spherical lens 116 and the seventh spherical lens 118 respectively are positive, positive, negative, positive, negative, positive and positive. Specifically, the first spherical lens 111 is a dual convex lens, and the surface S1 thereof faces the object point and the surface S2 thereof faces the image point. The second spherical lens 112 is a dual convex lens, and the surface S3 thereof faces the object point and the surface S4 thereof faces the image point. The third spherical lens 113 is a dual concave lens, the surface S4 thereof faces the object point and the surface S5 thereof faces the image point, and the second spherical lens 112 and the third spherical lens 113 combine into a first di-cemented lens. The fourth spherical lens 114 is a concave-convex lens, and the surface S6 thereof faces the object point and the surface S7 thereof faces the image point. The fifth spherical lens 115 is a concave-convex lens, and the surface S8 thereof faces the object point and the surface S9 thereof faces the image point. The sixth spherical lens 116 is a concave-convex lens, the surface S9 thereof faces the object point and the surface S10 thereof faces the image point, and the fifth spherical lens 115 and the sixth spherical lens 116 combine into a second di-cemented lens. The aperture stop 119 has a surface S11. The first aspherical lens 117 is an axisymmetric aspherical lens, and the surface S12 thereof faces the object point and the surface S13 thereof faces the image point. The seventh spherical lens 118 is a concave-convex lens, the surface S13 thereof faces the object point and the surface S14 thereof faces the image point, and the first aspherical lens 117 and the seventh spherical lens 118 combine into a third di-cemented lens.

Figure 2B:
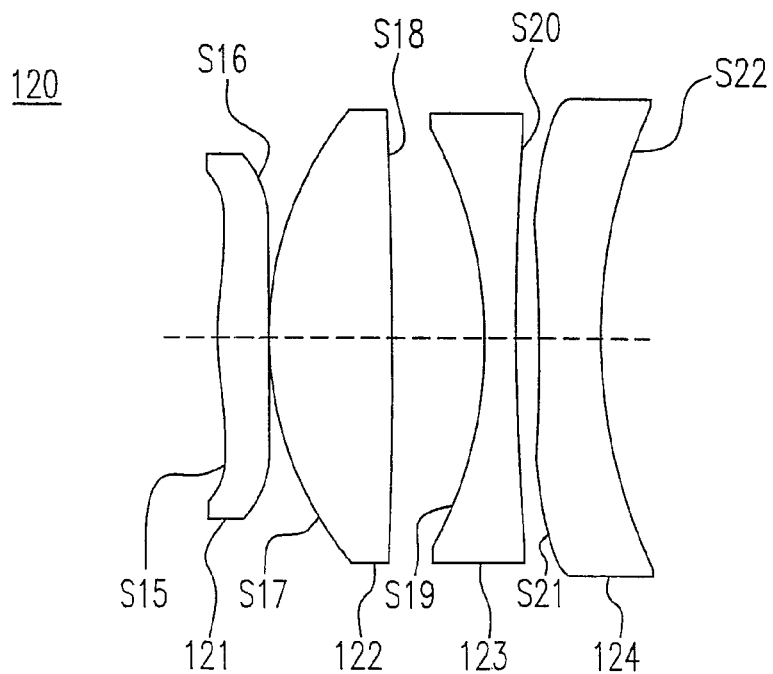

FIG. 2(b) is a schematic diagram illustrating the second lens group 120 of the present invention. The diopters of the eighth spherical lens 122 and the ninth spherical lens 123 respectively are positive and negative. Specifically, the second aspherical lens 121 is an axisymmetric aspherical lens, and the surface S15 thereof faces the object point and the surface S16 thereof faces the image point. The eighth spherical lens 122 is a dual convex lens, and the surface S17 thereof faces the object point and the surface S18 thereof faces the image point. The ninth spherical lens 123 is a dual concave lens, and the surface S19 thereof faces the object point and the surface S20 thereof faces the image point. The third aspherical lens 124 is an axisymmetric aspherical lens, and the surface S21 thereof faces the object point and the surface S22 thereof faces the image point.

In the first lens group 110, the aperture stop 119 on the surface S12 of the first aspherical lens 117 can regulate the quantity of light, and one of the surface S12 and the surface S13 must be an axisymmetric asphere to decrease the slope of the third aspherical lens 124 and to converge the angle of the beam emitting from the third aspherical lens 124. The first aspherical lens 117 can be made by a flint glass, which complies with the following condition:

Refractive index($Nd$)≥1.6, and dispersion rate($Vd$)≤55.

In order to improve the aberration produced by the beam passing through the wide angle projection lens at a large numerical aperture, the three di-cemented lenses are used in the first lens group 110, i.e. the first, the second and the third di-cemented lenses. The di-cemented lenses can dispel a polychromatic aberration, such as a longitudinal chromatic aberration and a transverse chromatic aberration. The refractive index variations of the beam passing through the first di-cemented lens is from high to low, the refractive index variations of the beam passing through the second di-cemented lens is from low to high and the refractive index variations of the beam passing through the third di-cemented lens is from high to low. Because of the three di-cemented lenses set in the wide angle projection lens, the wide angle projection system has a low Abbe number range of 25 to 40 and a high Abbe number range of 52 to 82.

In the second lens group 120, the second aspherical lens 121 can improve a coma of the wide angle projection system and the third aspherical lens 124 can improve astigmatism in the large numerical aperture (f/1.67). That is to say, the second aspherical lens 121 can decrease the coma produced from the wide angle projection system and the third aspherical lens 124 can decrease the astigmatism when the wide angle projection lens is in a state of the large numerical aperture (f/1.67). In addition, the second aspherical lens 121 and the third aspherical lens 124 can reduce the focal length of the wide angle projection lens 103 to shorten the distance between the third aspherical lens 124 and the reflector 130 and decrease the length of the wide angle projection lens. The total length of the refraction system of the present invention is T1, the distance between the refraction system and the reflector 130 is T2, and the wide angle projection lens 103 of the present invention complies with the following condition:

0.75<$T2/T1$<0.80

In the second lens group 120, the eighth aspherical lens 122 is a field lens, which is used for prolonging the beam to increase a field of view of the wide angle lens. Since the diopter of the eighth aspherical lens 122 is positive which can let the beam been gathered to the optical axis 104 (as shown in FIG. 4), the size of the ninth spherical lens 123 and the third aspherical lens which configured near the image point been narrowed.

Figure 3:
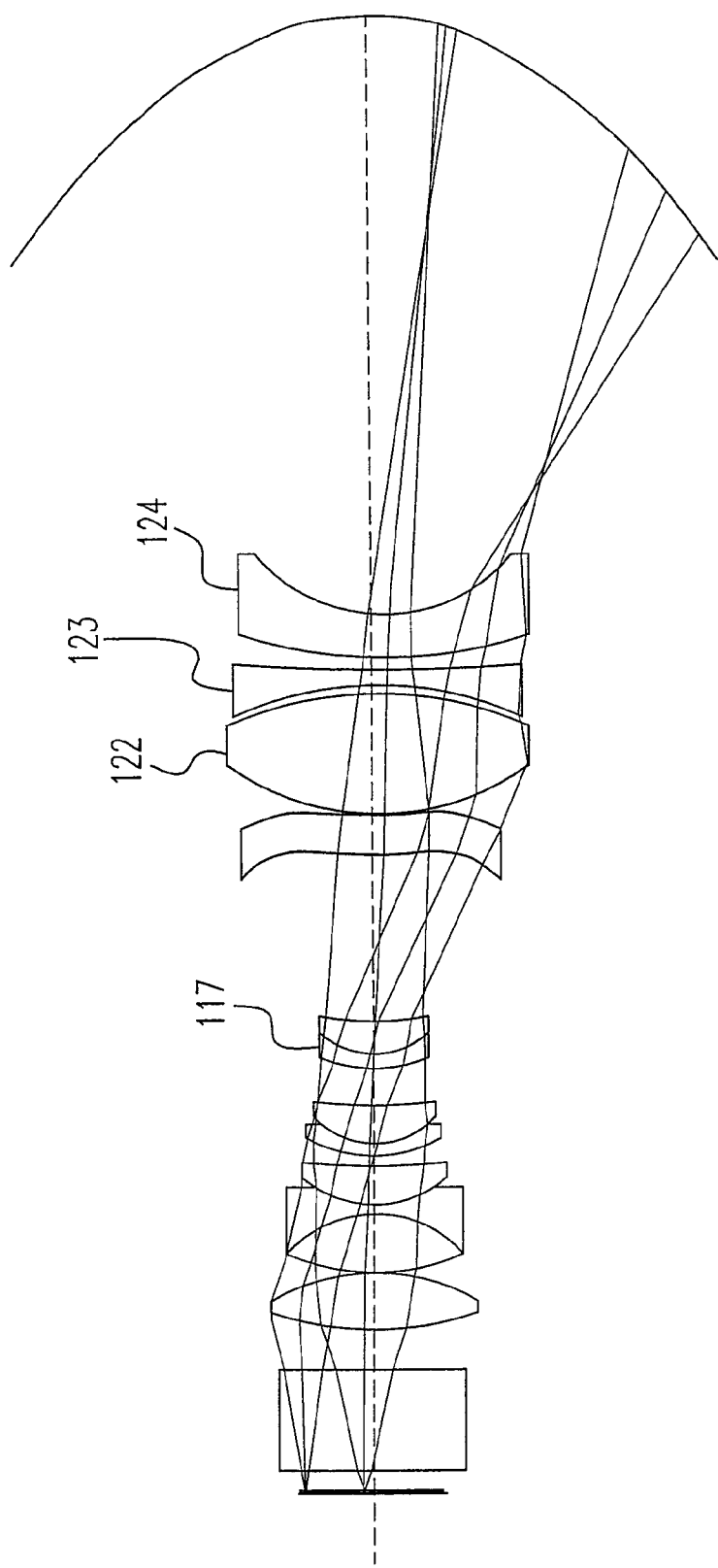
FIG. 3 is a cross-section-viewed schematic diagram illustrating an optical path if a first aspherical lens is a spherical lens in accordance with the present invention.

If the first aspherical lens 117 in the first lens group 110 is a spherical lens, then the slope of the third aspherical lens 124 will be increased (as shown in FIG. 3). Therefore, in order to avoid the total interface reflection and Fresnel loss, the present invention uses one surface of the first aspherical lens 117 being the axisymmetric asphere.

Figure 4A:
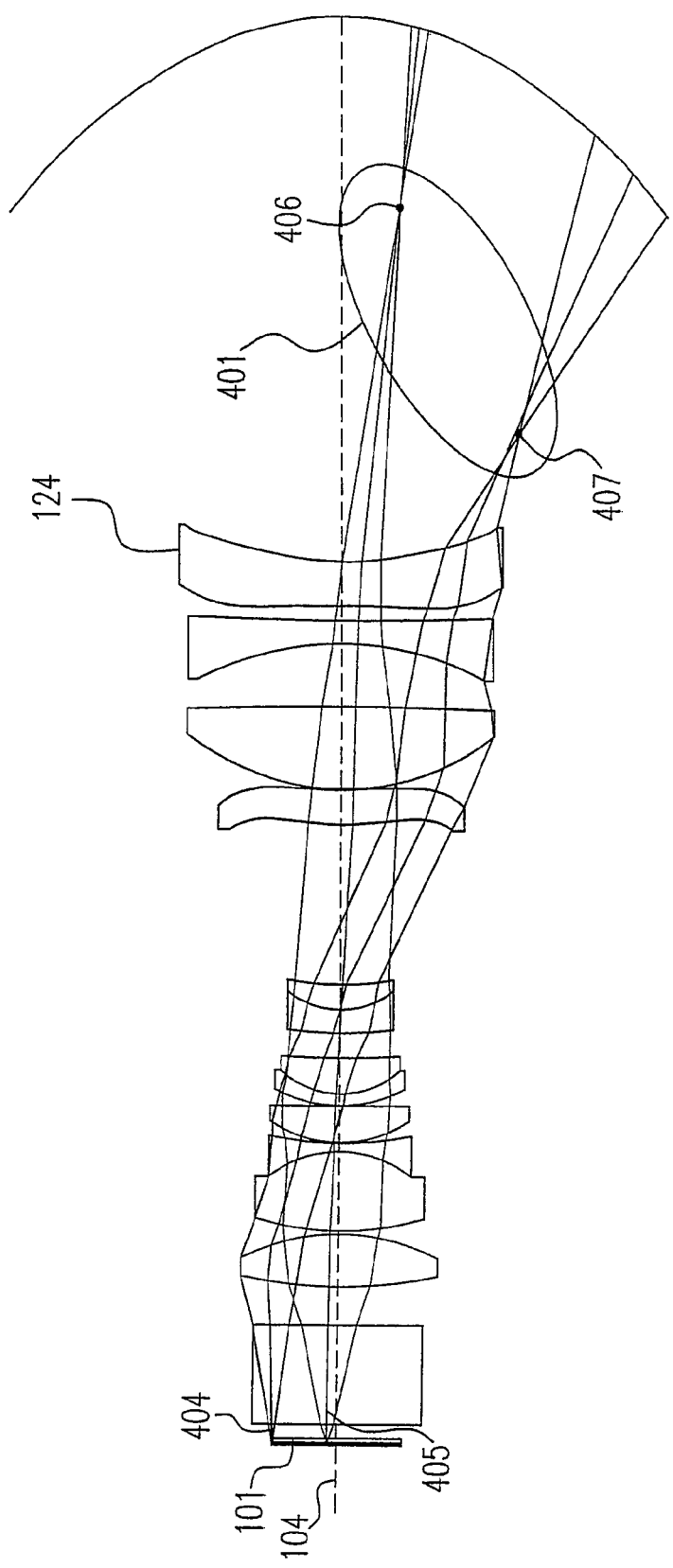
FIG. 4(a) shows a first image and FIG. 4(b) shows a second image projected on the screen in accordance with the present invention.
Figure 4B:
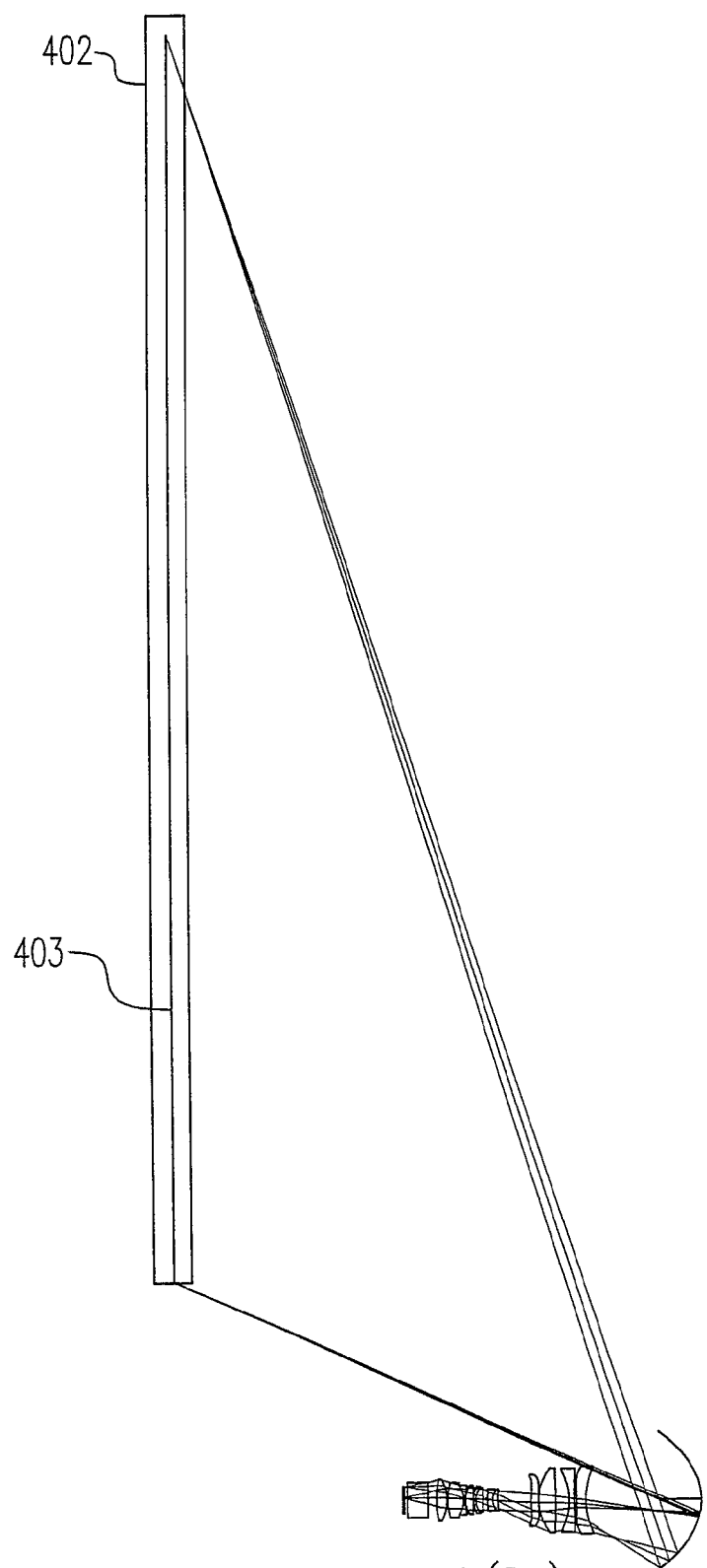

FIG. 4. Is a schematic diagram illustrating the beam passing through the wide angle projection system of the present invention. The image will be rendered on the image processing element 101 above the optical axis 104. When the beam passing through the first lens group 110 and the second lens group 120 (the nearest ray and the farthest ray are shown in FIG. 4($a$)), the ray closer to the optical axis is a near-axis ray 405 and the ray farther away from the optical axis is a off-axis ray 404, the foci of the two rays will fall between the third aspherical 124 and the concave reflector 130 to form a first image 401. The image 401 is reflected to the screen 402 by the concave reflector 130 to form a second image (as shown in FIG. 4($b$)). The distance between the focus 406 of the near-axial light 405 and the refraction system will larger than the distance between the focus 407 of the off-axial light 404 and the refraction system.

The relationship between the projecting distance of the wide angle projection system 100 and the diagonal length of the screen 402 is as following:

Projecting distance/diagonal length of the screen<0.3

Figure 5:
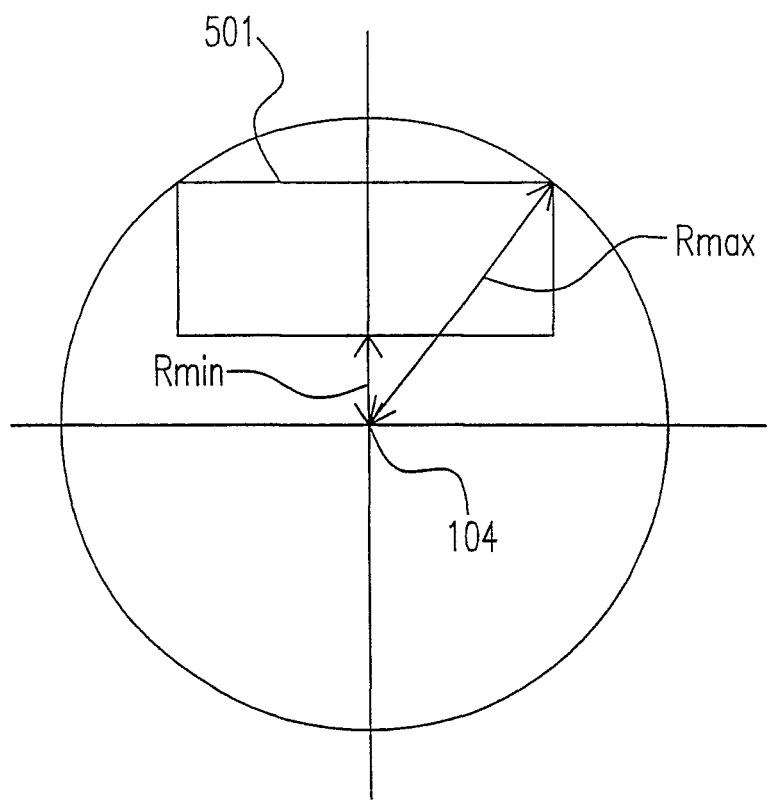
FIG. 5 is a schematic diagram illustrating the position and the ratio of the wide angle projection lens and the object in accordance with the present invention.

FIG. 5 is a schematic diagram illustrating the position and the ratio of the wide angle projection lens and the object of the present invention. In FIG. 5, the center point of the horizontal axis and the longitudinal axis is the optical axis 104, and on the longitudinal axis near the optical axis 104 is a near-axis and on the longitudinal axis away from the optical axis 104 is an off-axis. A projected object 501 is set above the optical axis 104, wherein there is a shortest distance Rmin and a longest distance Rmax between the optical axis 104 and the projected object 501. The relationship of the wide angle projection lens 103 and the projected object 501 is as following:

0.1<$R$min/$R$max<0.5

Figure 6A:
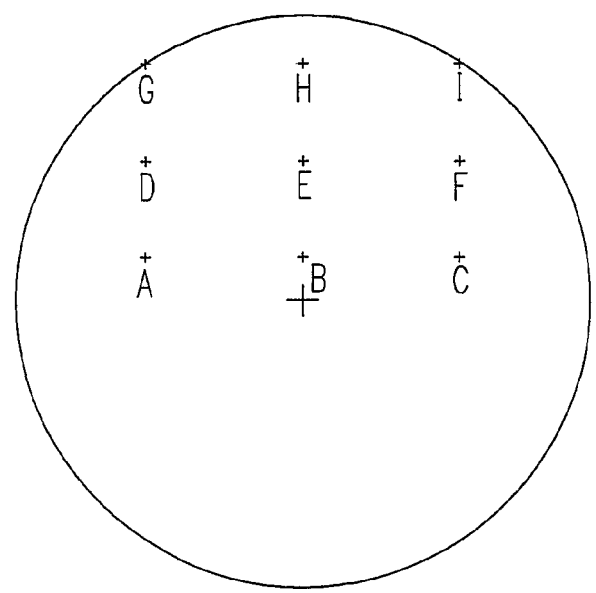
FIG. 6(a) is a schematic diagram illustrating the image on the processing element in accordance with the present invention.
Figure 6B:
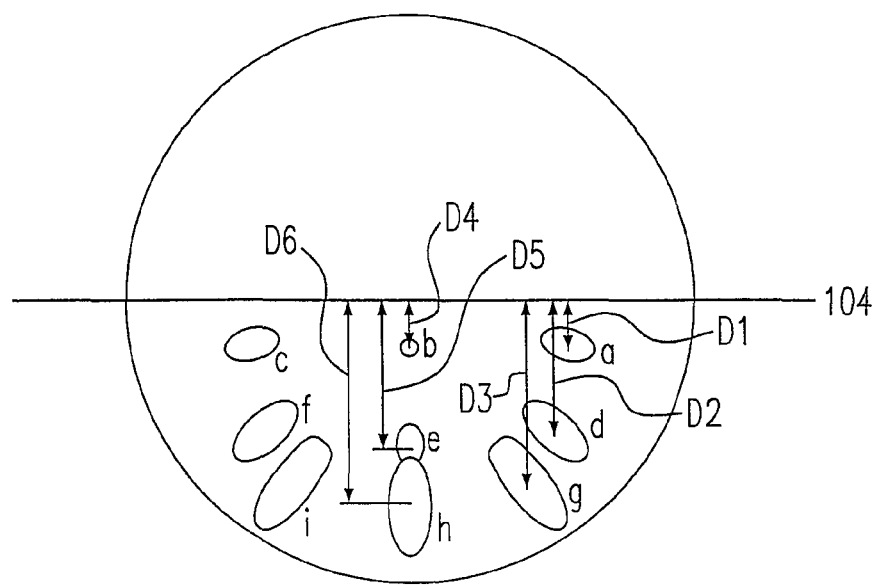
FIG. 6(b) is a schematic diagram illustrating the first image produced from the object pass-through the first and the second lens groups in accordance with the present invention.

An image is rendered on the image processing element 101 (as shown in FIG. 6($a$)). Firstly, the image is divided into 9 equal portions (A-I). The first image formed when the beam passing through the refraction system will be showed as a spot (a-i) which is barrel distortion, and the spot is called arch-like spot. The barrel distortion is worse when the position of the image is farther away from the optical axis 104 (as shown in FIG. 6($b$)). There are vertical distances between the spot a to spot i and the optical axis 104, wherein the vertical distance between the spot a and the optical axis 104 is D1, the vertical distance between the spot d and the optical axis 104 is D2, the vertical distance between the spot g and the optical axis 104 is D3, the vertical distance between the spot b and the optical axis 104 is D4, the vertical distance between the spot e and the optical axis 104 is D5 and the vertical distance between the spot h and the optical axis 104 is D6. The relationship of the vertical distance between the arch-like spot and the optical axis 104 is as following:

1<$D4/D1$<1.2, 1<$D5/D2$<1.2 and 1<$D6/D3$<1.2.

Figure 7A:
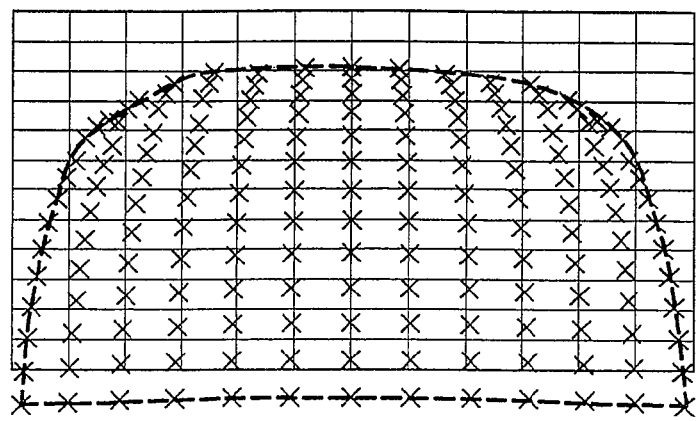
FIG. 7(a) is a schematic diagram illustrating the first image in accordance with the present invention.
Figure 7B:
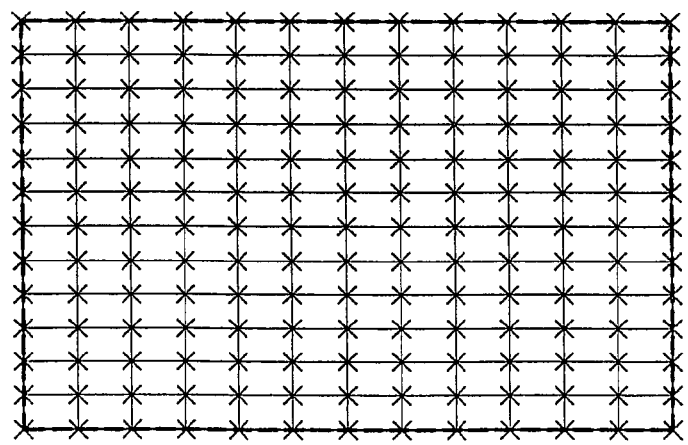
FIG. 7(b) is a schematic diagram illustrating the second image in accordance with the present invention.
Figure 8A:
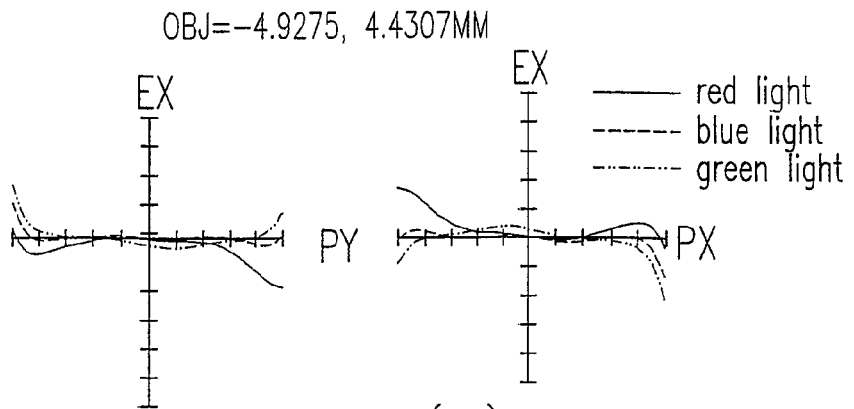
FIGS. 8(a)-8(c), 8(d)-8(f) and 8(g)-8(i) represent a ray fan of the wide angle projection lens respectively projected to a 40", a 50" and a 60" screens in accordance with the present invention.
Figure 8B:
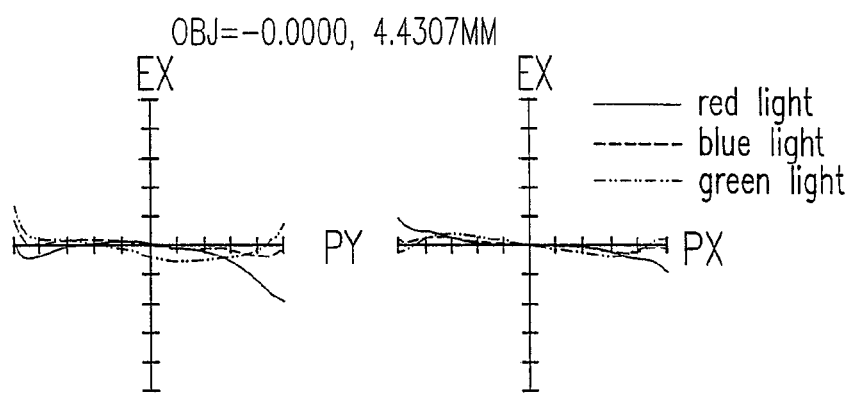
Figure 8C:
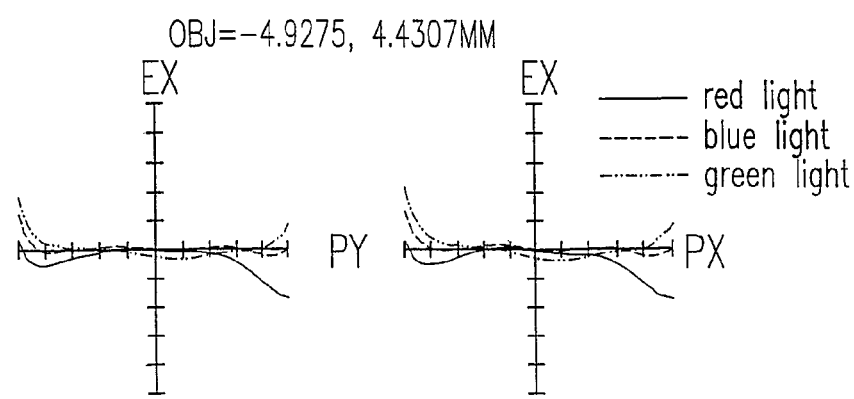
Figure 8D:
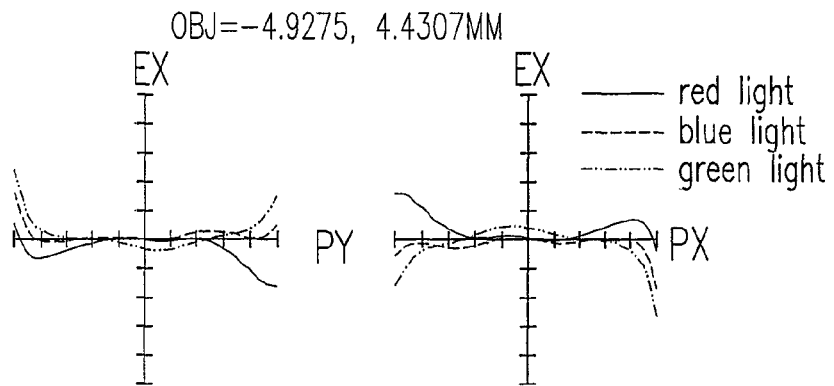
Figure 8E:
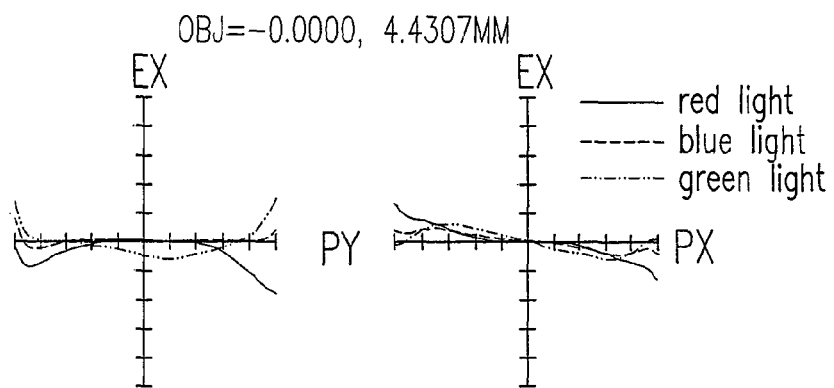
Figure 8F:
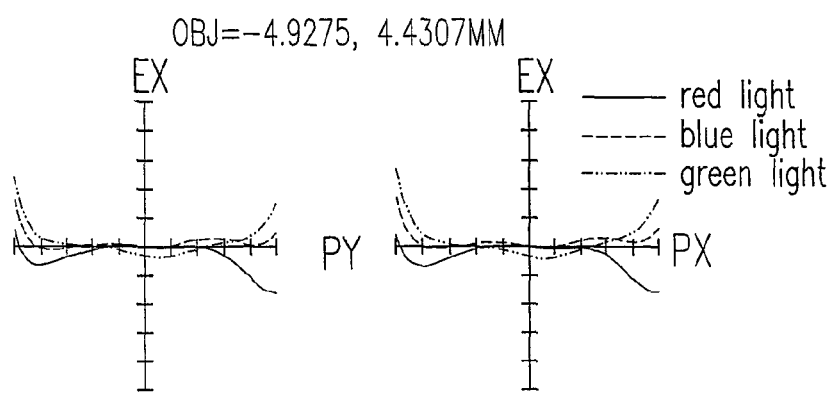
Figure 8G:
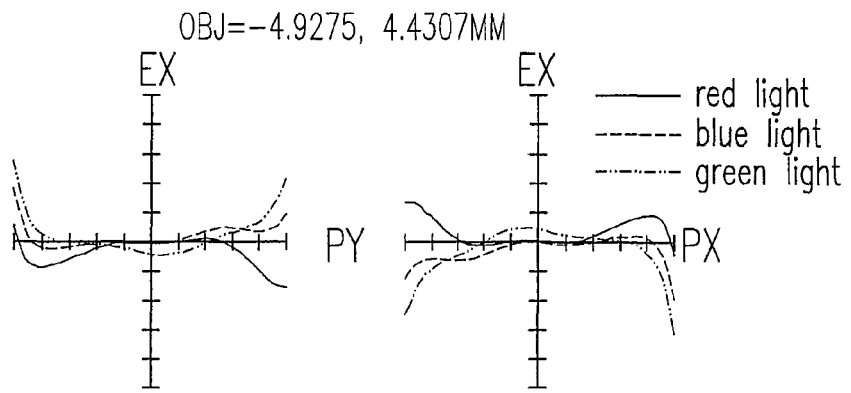
Figure 8H:
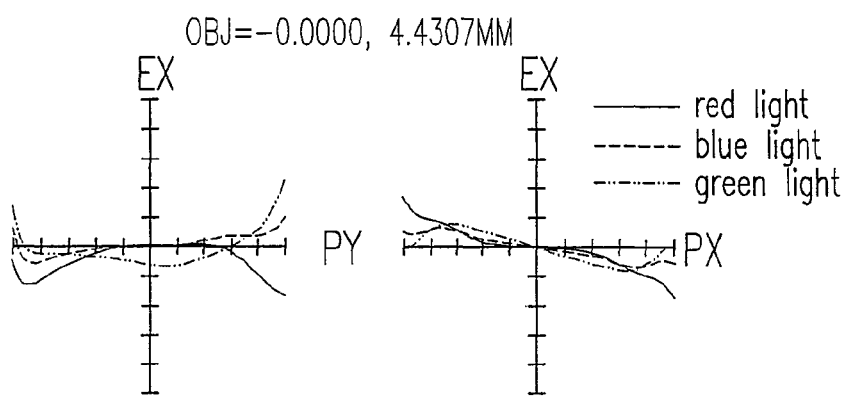
Figure 8I:
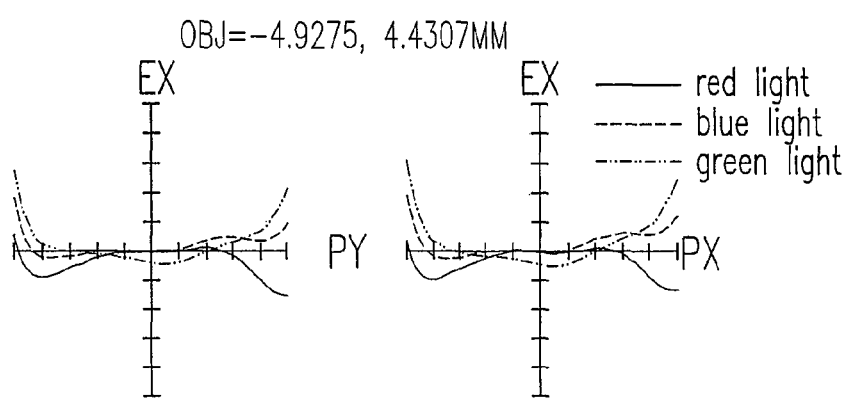

The arch-like spot (as shown in FIG. 7($a$)) produced by the beam passing through the refraction system can be compensated by the concave reflector 130. The arch-like spot will become a second image 403 with a non-distortion image (as shown in FIG. 7($b$)) after reflecting to the screen 402 by the concave reflector 130.

When the distance between the wide angle projection system 100 and the screen 402 is adjusted because the distance is changed, the lateral color will getting worse because of the longer distance and the aberration on the screen 402 will become more serious. The adjustment of the distance between the third aspherical lens 124 and the concave reflector 130 will compensate the distorted first image 401 located between the third aspherical lens 124 and the concave reflector 130, and then obtain the second image 403 with non-distortion image on the screen 402.

FIGS. 8 and 9 are optical analog data diagrams of the image quality of the present invention. FIGS. 8(a)-8(c), 8(d)-8(f) and 8(g)-8(i) represent a ray fan of the wide angle projection lens that a red light, a blue light and a green light respectively projected to a 40", a 50" and a 60" screens. The horizontal axis of each FIG. is the position of each ray passing through the aperture stop and the vertical axis is the position of the rays located on the screen. FIGS. 8(a)-8(i) show the offset positions of the red light, the blue light and the green light are not big. Hence, the aberration of the image projected by the wide angle projection lens of the present invention is low.

Figure 9A:
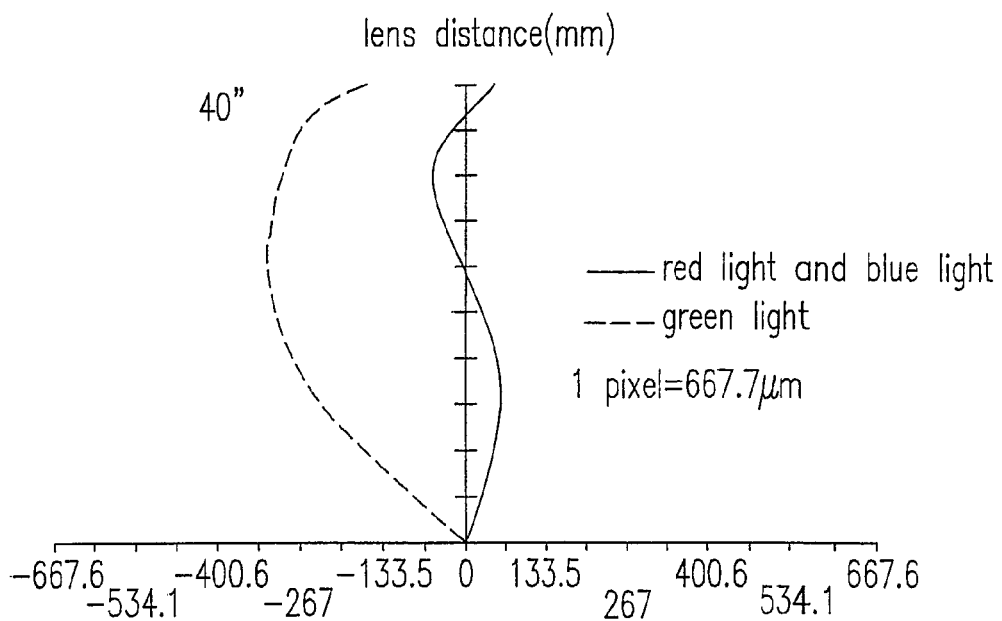
FIGS. 9(a)-9(c) represent a lateral color of the wide angle projection lens respectively projected to a 40", a 50" and a 60" screens in accordance with the present invention.
Figure 9B:
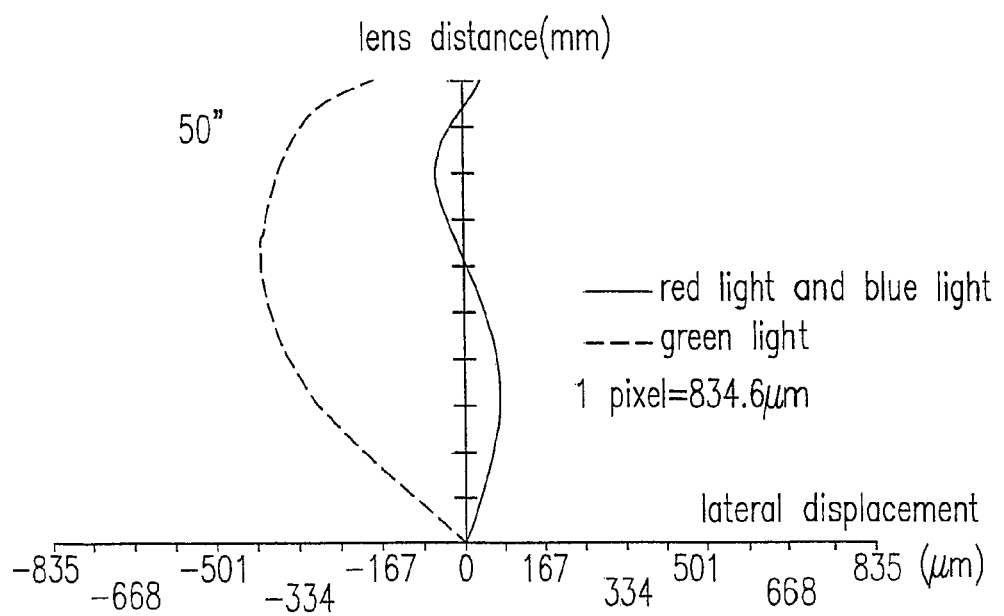
Figure 9C:
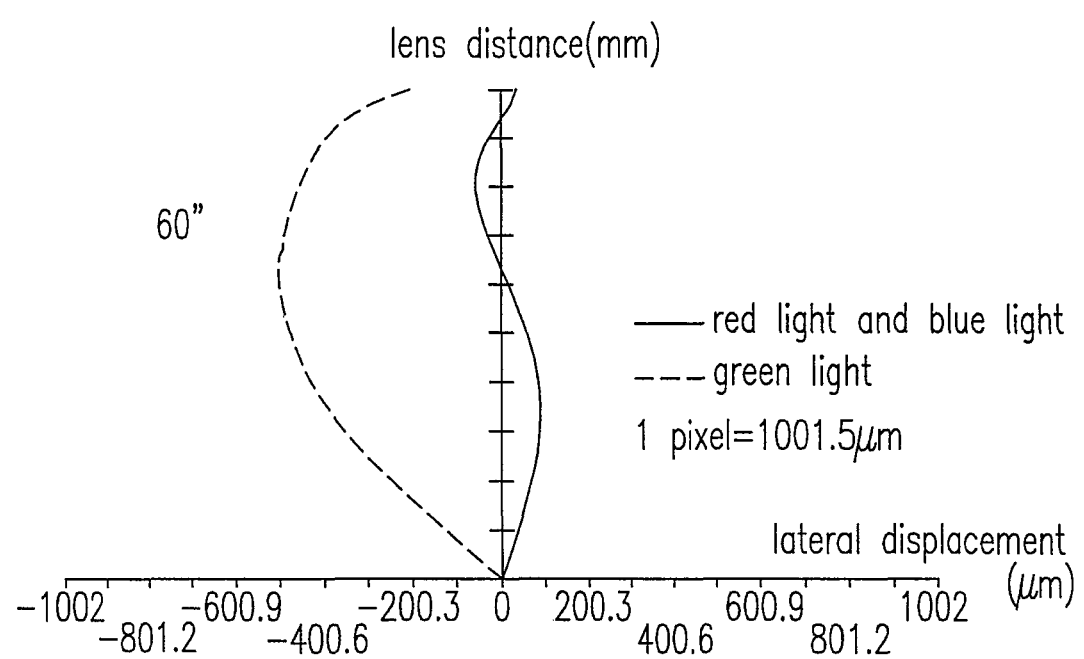

FIGS. 9(a)-9(c) represent a lateral color of the wide angle projection lens respectively projected to a 40", a 50" and a 60" screens. The horizontal axis of each FIG. is the offset of each ray located on the screen and the vertical axis is the position of the rays located on the screen, related with the green light. In the FIGS. 9(a)-9(c), the dotted line on the left is the offset of the green light, and the solid line on the right is the offset of the red light and the blue light, wherein the red light has good superimposability with the blue light. The FIGS. 9(a)-9(c) show that even the lateral color of the green light is larger than that of the red light and the blue light, the lateral colors of the green light on the all screen size are not more than 0.6 pixels. Hence, the lateral color of the wide angle projection lens of the present invention is low.

According to a spot diagram which is a diagram illustrating the different spot size projected to a 40", a 50" and a 60" screen. The root mean square (RMS) spot size all less than 0.61 pixels which the spot projected to the 40", the 50" and the 60" screen. It is thus evident that the spots after projection are all small and the comet tails thereof are also not obvious. Accordingly, the coma of the image produced by the wide angle projection lens of the present invention is very low.

According to a geometric modulation transfer function (MTF) of the screen when each color projects to a 40", a 50" and a 60" screen. At the maximum numerical aperture (f/1.67), the MTF of each color on each size of the screen is greater than 45%. In the case of 67 line pairs per millimeter (67 lp/mm), the polychromatic MTF on each size of the screen are greater than 55%. It is thus evident that the resolution of projecting to each size of the screen is high. Therefore, the wide angle projection lens of the present invention has good resolution.

EMBODIMENT 1

In the embodiment 1 of the present invention, the wide angle projection lens 103 complies with the following conditions: the effective focal length (EFFL)=−2.89 mm, the f-number (f#)=1.67, the offset=1.22%, the resolution reach 67 lp/mm, the screen size is 40-inch~60-inch, the projection distance is 282~418 mm and the projection ratio (projection distance/screen diagonal) is 0.274~0.278.

EMBODIMENT 2

In another embodiment, the effective focal length of the wide angle projection lens 103 in the F/1.67 fixed-focus system is −2.89 mm, the effective focal length of the refraction system is 12.02 mm and the effective focal length of the reflector is 19.39 mm. Hence the wide angle projection lens of the present invention is satisfied with the large numerical aperture fixed-focus system.

EMBODIMENT 3

In another embodiment, if the length and the width of the image processing element all comply with the condition of the present invention, the theoretical f-number (f#) is 1.67. A minimized f-number 1.67 of the wide angle projection lens is set to satisfy the system above-mentioned and through the calculation of the étendue, the light collection efficiency of the wide angle projection lens can be up to 87.4%.

There are further embodiments provided as follows.

Embodiment 1. In a wide angle lens for decreasing an imaging aberration in a large numerical aperture, including: a refraction system and a reflection system. The refraction system including a first lens group having a plurality of spherical lenses and at least one aspherical lens and a second lens group including at least one spherical lens and at least two aspherical lenses, wherein the at least one spherical lens is configured between any two of the at least two aspherical lenses.

Embodiment 2. In the wide angle lens according to the above-mentioned embodiment 1, further including an object side and an image side. A beam passes from the object side to the image side. The first lens group includes seven spherical lenses and one aspherical lens. A sequence of the seven spherical lenses and the one aspherical lens counted from the object side to the image side is a first spherical lens, a second spherical lens, a third spherical lens, a fourth spherical lens, a fifth spherical lens, a sixth spherical lens, a first aspherical lens and a seventh spherical lens. The second lens group includes two spherical lenses and two aspherical lenses. A sequence of the two spherical lenses and the two aspherical lenses counted from the object side to the image side is a second aspherical lens, an eighth spherical lens, a ninth spherical lens and a third aspherical lens. The reflection system is an axisymmetric aspherical concave reflector used to reflect the beam passing through the first lens group and the second lens group.

Embodiment 3. In the wide angle lens according to the above-mentioned embodiment 2, the first, the second and the third aspherical lenses are axisymmetric aspherical lenses. The first aspherical lens is used for decreasing a far-field resolution of the wide angle lens in the large numerical aperture. The second and the third aspherical lenses are used for decreasing a coma of an image produced by the wide angle lens.

Embodiment 4. In the wide angle lens according to the above-mentioned embodiment 2, further including a lens barrel. The second aspherical lens is used to shorten a distance between the third aspherical lens and the axisymmetric aspherical concave reflector to decrease a length of the lens barrel.

Embodiment 5. In the wide angle lens according to the above-mentioned embodiment 3, the first aspherical lens has at least one surface of an axisymmetric asphere used for decreasing a slope of the third aspherical lens.

Embodiment 6. In the wide angle lens according to the above-mentioned embodiment 3, further including an optical axis. The first to the third aspherical lenses have respective surfaces. Each surfaces the first to the third aspherical lenses of has a specific curvature. The curvatures of the respective at least one surfaces of the respective second and the third aspherical lenses have various slopes from the optical axis to the edge of the second aspherical lens and to the edge of the third aspherical lens.

Embodiment 7. In the wide angle lens according to the above-mentioned embodiment 3, the axisymmetric aspherical concave reflector has an imaging quality reflected therefrom which is corrected by adjusting the distance between the third aspherical lens and the axisymmetric aspherical concave reflector.

Embodiment 8. In the wide angle lens according to the above-mentioned embodiment 2, further including a polychromatic aberration, a longitudinal chromatic aberration and a transverse chromatic aberration. The beam has refractive index changes. The second spherical lens and the third spherical lens, the fifth spherical lens and the sixth spherical lens, and the first aspherical lens and the seventh spherical lens are respectively combined into a first di-cemented lens, a second di-cemented lens and a third di-cemented lens. The first to the third di-cemented lenses are used for dispelling the polychromatic aberration and improving the axial color and the lateral color. The refractive index changes of the beam passing through the first, the second and the third di-cemented lenses are respectively from high to low, low to high and high to low.

Embodiment 9. In the wide angle lens according to the above-mentioned embodiment 2, further including a field of view. The eighth spherical lens is a field lens used for guiding the beam to increase the field of view and to maintain sizes of the third aspherical lens and the axisymmetric aspherical concave reflector.

Embodiment 10. In the wide angle lens according to the above-mentioned embodiment 2, further including a focal length. The beam passing through the first lens group and the second lens group produces an image having a geometric distortion and a field curvature. The axisymmetric aspherical concave reflector is used for decreasing the geometric distortion and the field curvature, and shortening the focal length.

Embodiment 11. In the wide angle lens according to the above-mentioned embodiment 2, further including an aperture stop configured between the sixth spherical lens and the first aspherical lens.

Embodiment 12. In the wide angle lens according to the above-mentioned embodiment 1, the refraction system and the reflection system produce a positive dioptre. The route of the beam while passing through the refraction system and the reflection system does not turn. The wide angle lens complies with a condition: $0.75 < A/B < 0.80$, where A is a distance between the refraction system and the reflection system, and B is a total length of the refraction system.

Embodiment 13. In the wide angle lens according to the above-mentioned embodiment 1, further including an f-number less than 1.70.

Embodiment 14. In the wide angle lens according to the above-mentioned embodiment 1, further including a first effective focal length F1. The refraction system has a second effective focal length F2. The reflection system has a third effective focal length F3. The wide angle lens complies with a condition: $2.5 < |F2/F1| < 25.2$ and $2.5 < |F3/F1| < 20.8$.

Embodiment 15. In the wide angle lens according to the above-mentioned embodiment 1, being a secondary imaging system. A first imaging is produced between the refraction system and the reflection system when the beam passes through the refraction system. The first imaging is a distortion imaging. A second imaging is produced on an external screen when the first imaging is reflected by the reflection system. The second imaging is a non-distortion imaging.

Embodiment 16. In a wide angle lens for decreasing an imaging aberration in a large numerical aperture, including a refraction system including a first lens group having at least one spherical lens and at least two aspherical lenses, wherein the at least one spherical lens is configured between any two of the at least two aspherical lenses.

Embodiment 17. In the wide angle lens according to the above-mentioned embodiment 16, further including an object side and an image side. A beam passes from the object side to the image side. The refraction system further includes a second lens group including a plurality of spherical lenses and at least one aspherical lens. And the at least one aspherical lens is configured between the plurality of spherical lenses.

Embodiment 18. In the wide angle lens according to the above-mentioned embodiment 17, wherein at least six spherical lenses of the plurality of spherical lenses are configured at the object side in front of the at least one aspherical lens. At least one spherical lens of the plurality of spherical lenses is configured at the image side behind the at least one aspherical lens.

Embodiment 19. In the wide angle lens according to the above-mentioned embodiment 17, further including a reflection system. The reflection system is an axisymmetric aspherical concave reflector used to reflect the beam passing through the second lens group and the first lens group.

Embodiment 20. In a decreasing a focus of a wide angle lens process, wherein the wide angle lens includes a field lens and an aspherical lens, and the field lens includes an incident side, the method including a step of configuring the aspherical lens at the incident side of the field lens.

While the invention has been described in terms of what is presently considered to be the most practical and preferred embodiments, it is to be understood that the invention needs not be limited to the disclosed embodiments. Therefore, it is intended to cover various modifications and similar configuration included within the spirit and scope of the appended claims, which are to be accorded with the broadest interpretation so as to encompass all such modifications and similar structures.

What is claimed is:

1. A wide angle lens having a first effective focal length F1 for decreasing an imaging aberration in a large numerical aperture, comprising:
    a refraction system having a second effective focal length F2, including:
    a first lens group having a plurality of spherical lenses and at least one aspherical lens; and
    a second lens group including at least one spherical lens and at least two aspherical lenses, wherein the at least one spherical lens is configured between any two of the at least two aspherical lenses; and
    a reflection system having a third effective focal length F3, wherein the wide angle lens complies with a condition:

$$2.5 < |F2/F1| < 25.2 \text{ and } 2.5 < |F3/F1| < 20.8.$$

2. The wide angle lens according to claim 1, further comprising an object side and an image side, wherein:
    a beam passes from the object side to the image side;
    the first lens group comprises seven spherical lenses and one aspherical lens, wherein a sequence of the seven spherical lenses and the one aspherical lens counted from the object side to the image side is a first spherical lens, a second spherical lens, a third spherical lens, a fourth spherical lens, a fifth spherical lens, a sixth spherical lens, a first aspherical lens and a seventh spherical lens;
    the second lens group comprises two spherical lenses and two aspherical lenses, wherein a sequence of the two spherical lenses and the two aspherical lenses counted from the object side to the image side is a second aspherical lens, an eighth spherical lens, a ninth spherical lens and a third aspherical lens; and
    the reflection system is an axisymmetric aspherical concave reflector used to reflect the beam passing through the first lens group and the second lens group.

3. The wide angle lens according to claim 2, wherein the first, the second and the third aspherical lenses are axisymmetric aspherical lenses, the first aspherical lens is used for improving a far-field resolution of the wide angle lens in the large numerical aperture, and the second and the third aspherical lenses are used for decreasing a coma of an image produced by the wide angle lens.

4. The wide angle lens according to claim 2, further comprising a lens barrel, wherein the second aspherical lens is used to shorten a distance between the third aspherical lens and the axisymmetric aspherical concave reflector to decrease a length of the lens barrel.

5. The wide angle lens according to claim 3, wherein the first aspherical lens has at least one surface of an axisymmetric asphere used for decreasing a slope of the third aspherical lens.

6. The wide angle lens according to claim 3, further comprising an optical axis, wherein the first to the third aspherical lenses have respective surfaces, each of which has a specific curvature, at least one of the specific curvatures of the second and the third aspherical lenses has plural slopes from the optical axis to the edge thereof with respective values of positive slopes and negative slopes.

7. The wide angle lens according to claim 3, wherein the axisymmetric aspherical concave reflector has an imaging quality reflected therefrom which is corrected by adjusting the distance between the third aspherical lens and the axisymmetric aspherical concave reflector.

8. The wide angle lens according to claim 2, further comprising a polychromatic aberration, a longitudinal chromatic aberration and a transverse chromatic aberration, wherein the beam has refractive index changes, the second spherical lens and the third spherical lens, the fifth spherical lens and the sixth spherical lens, and the first aspherical lens and the seventh spherical lens are respectively combined into a first di-cemented lens, a second di-cemented lens and a third di-cemented lens, which are used for dispelling the polychromatic aberration and improving the axial color and the lateral color, and the refractive index changes of the beam passing through the first, the second and the third di-cemented lenses are respectively from high to low, low to high and high to low.

9. The wide angle lens according to claim 2, further comprising a field of view, wherein the eighth spherical lens is a field lens used for guiding the beam to increase the field of view and to maintain sizes of the third aspherical lens and the axisymmetric aspherical concave reflector.

10. The wide angle lens according to claim 2, further comprising a focal length, wherein the beam passing through the first lens group and the second lens group produces an image having a geometric distortion and a field curvature, the axisymmetric aspherical concave reflector is used for decreasing the geometric distortion and the field curvature, and shortening the focal length.

11. The wide angle lens according to claim 2, further comprising an aperture stop configured between the sixth spherical lens and the first aspherical lens.

12. The wide angle lens according to claim 1, further comprising an f-number less than 1.70.

13. The wide angle lens according to claim 1, being a secondary imaging system, wherein a first imaging is produced between the refraction system and the reflection system when the beam passes through the refraction system, the first imaging is a distortion imaging, a second imaging is produced on an external screen when the first imaging is reflected by the reflection system, and the second imaging is a non-distortion imaging.

14. A wide angle lens having a first effective focal length F1 for decreasing an imaging aberration in a large numerical aperture, comprising:
a refraction system having a second effective focal length F2, including a first lens group having at least one spherical lens and at least two aspherical lenses, wherein the at least one spherical lens is configured between any two of the at least two aspherical lenses; and
a reflection system having a third effective focal length F3, wherein the wide angle lens complies with a condition:
$2.5 < |F2/F1| < 25.2$ and $2.5 < |F3/F1| < 20.8$.

15. The wide angle lens according to claim 14, further comprising an object side and an image side, wherein a beam passes from the object side to the image side, the refraction system further comprises a second lens group including a plurality of spherical lenses and at least one aspherical lens, and the at least one aspherical lens is configured between the plurality of spherical lenses.

16. The wide angle lens according to claim 15, wherein at least six spherical lenses of the plurality of spherical lenses are configured at the object side in front of the at least one aspherical lens and at least one spherical lens of the plurality of spherical lenses is configured at the image side behind the at least one aspherical lens.

17. The wide angle lens according to claim 14, wherein the reflection system is an axisymmetric aspherical concave reflector used to reflect the beam passing through the second lens group and the first lens group.

18. A wide angle lens according to claim 1, wherein an f-number of the wide angle lens ranges between 1.7~2.4.

19. A wide angle lens for decreasing an imaging aberration in a large numerical aperture, comprising:
a refraction system, including
a first lens group having a plurality of spherical lenses and at least one aspherical lens; and
a second lens group including at least one spherical lens and at least two aspherical lenses, wherein the at least one spherical lens is configured between any two of the at least two aspherical lenses; and
a reflection system, wherein the refraction system and the reflection system produce a positive diopter, and a route of a beam while passing through the refraction system and the reflection system does not turn, and the wide angle lens complies with a condition:
$0.75 < A/B < 0.80$,
where A is a distance between the refraction system and the reflection system, and B is a total length of the refraction system.

* * * * *